US010922366B2

United States Patent
Huang et al.

(10) Patent No.: US 10,922,366 B2
(45) Date of Patent: Feb. 16, 2021

(54) SELF-ADAPTIVE WEB CRAWLING AND TEXT EXTRACTION

(71) Applicant: INTERNATIONAL BUSINESS MACHINES CORPORATION, Armonk, NY (US)

(72) Inventors: Chen-Yu Huang, Taipei (TW); Sheng-Wei Lee, Changhua (TW); June-Ray Lin, Taipei (TW); Ci-Hao Wu, Taipei (TW); Hsieh-Lung Yang, Taipei (TW); Ying-Chen Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/936,666

(22) Filed: Mar. 27, 2018

(65) Prior Publication Data
US 2019/0303501 A1    Oct. 3, 2019

(51) Int. Cl.
*G06F 16/951*    (2019.01)
*G06F 16/958*    (2019.01)
(Continued)

(52) U.S. Cl.
CPC ........ *G06F 16/9535* (2019.01); *G06F 16/334* (2019.01); *G06F 16/986* (2019.01); *G06F 40/279* (2020.01); *H04L 67/02* (2013.01)

(58) Field of Classification Search
CPC ............................ G06F 16/951; G06F 40/103
See application file for complete search history.

(56) References Cited

U.S. PATENT DOCUMENTS 6,408,297 B1 *  6/2002  Ohashi ................. G06F 16/951
6,519,557 B1 *  2/2003  Emens ................... G06F 40/58
                                                              704/8
(Continued)

FOREIGN PATENT DOCUMENTS

CN    101464905 A  *  6/2009
CN    102760150 A  *  10/2012
(Continued)

OTHER PUBLICATIONS

Kaddu et al., "To Extract Informative Content from Online Web Pages by Using Hybrid Approach", 2016 International Conference on Electrical, Electronics, and Optimization Techniques (ICEEOT), Mar. 3-5, 2016, 6 pages. (Year: 2016).*

(Continued)

*Primary Examiner* — Phuong Thao Cao
(74) *Attorney, Agent, or Firm* — Erik K. Johnson

(57) ABSTRACT

A method, computer system, and a computer program product for crawling and extracting main content from a web page is provided. The present invention may include retrieving a HTML document associated with a web page. The present invention may then include identifying at least one entry point located in the retrieved HTML document by utilizing a self-adaptive entry point locator. The present invention may also include extracting a main content article associated with the retrieved HTML document based on the identified at least one entry point. The present invention may further include presenting the extracted main content associated with the retrieved HTML document to the user.

17 Claims, 6 Drawing Sheets

(51) Int. Cl.
*H04L 29/08* (2006.01)
*G06F 40/103* (2020.01)
*G06F 16/9535* (2019.01)
*G06F 16/33* (2019.01)
*G06F 40/279* (2020.01)

(56) References Cited

U.S. PATENT DOCUMENTS

| | | | | |
|---|---|---|---|---|
| 6,920,609 | B1* | 7/2005 | Manber | G06F 16/951 |
| | | | | 715/205 |
| 7,100,117 | B1* | 8/2006 | Chwa | H04N 21/235 |
| | | | | 375/E7.024 |
| 7,188,308 | B2* | 3/2007 | Weise | G06F 3/0482 |
| | | | | 715/273 |
| 7,581,170 | B2 | 8/2009 | Baumgartner et al. | |
| 7,640,494 | B1 | 12/2009 | Chen et al. | |
| 7,669,119 | B1 | 2/2010 | Orelind et al. | |
| 8,090,678 | B1* | 1/2012 | Glickman | G06F 16/35 |
| | | | | 707/602 |
| 8,812,949 | B2 | 8/2014 | Sandhaus | |
| 8,850,308 | B1* | 9/2014 | Roselander | G06F 16/986 |
| | | | | 715/239 |
| 8,868,621 | B2 | 10/2014 | D'Onofrio, II et al. | |
| 8,943,588 | B1* | 1/2015 | Speegle | H04L 63/1483 |
| | | | | 726/22 |
| 9,477,756 | B1* | 10/2016 | Park | G06F 16/951 |
| 9,934,206 | B2* | 4/2018 | Tang | G06F 3/0488 |
| 10,250,621 | B1* | 4/2019 | Li | H04L 63/1416 |
| 2001/0047351 | A1* | 11/2001 | Abe | G06F 16/30 |
| 2004/0030687 | A1 | 2/2004 | Hidaka | G06F 40/131 |
| 2004/0044963 | A1* | 3/2004 | Uchiyama | G06F 16/81 |
| | | | | 715/229 |
| 2005/0060643 | A1* | 3/2005 | Glass | G06F 40/169 |
| | | | | 715/205 |
| 2007/0073758 | A1* | 3/2007 | Perry | G06Q 30/02 |
| 2008/0201633 | A1* | 8/2008 | Huang | G06F 40/14 |
| | | | | 715/239 |
| 2009/0083612 | A1* | 3/2009 | Baker | G06F 40/151 |
| | | | | 715/200 |
| 2009/0088254 | A1* | 4/2009 | Courage | A63F 13/12 |
| | | | | 463/42 |
| 2009/0327866 | A1* | 12/2009 | Li | G06F 16/00 |
| | | | | 715/234 |
| 2010/0146381 | A1* | 6/2010 | Tsai | G06F 16/84 |
| | | | | 715/234 |
| 2010/0268700 | A1* | 10/2010 | Wissner | G06F 16/367 |
| | | | | 707/706 |
| 2011/0131485 | A1* | 6/2011 | Bao | G06Q 30/02 |
| | | | | 715/243 |
| 2011/0225115 | A1* | 9/2011 | Moitra | G06F 3/04817 |
| | | | | 706/50 |
| 2013/0014002 | A1* | 1/2013 | Cai | G06F 16/80 |
| | | | | 715/234 |
| 2013/0024441 | A1* | 1/2013 | Sun | G06F 16/951 |
| | | | | 707/710 |
| 2013/0091150 | A1* | 4/2013 | Jin | G06F 16/24578 |
| | | | | 707/749 |
| 2013/0198391 | A1* | 8/2013 | Weissblum | H04L 63/306 |
| | | | | 709/227 |
| 2013/0283148 | A1* | 10/2013 | Lim | G06F 40/14 |
| | | | | 715/234 |
| 2014/0075299 | A1* | 3/2014 | Ain | G06F 40/258 |
| | | | | 715/255 |
| 2014/0317491 | A1* | 10/2014 | Bhandari | G06F 3/0481 |
| | | | | 715/234 |
| 2014/0337699 | A1* | 11/2014 | Tang | G06F 16/9577 |
| | | | | 715/205 |
| 2015/0142567 | A1* | 5/2015 | Neelakant | G06F 16/951 |
| | | | | 705/14.54 |
| 2015/0199432 | A1 | 7/2015 | Gailis et al. | |
| 2015/0227627 | A1* | 8/2015 | Iwabuchi | H04L 67/02 |
| | | | | 707/709 |
| 2016/0117093 | A1* | 4/2016 | Yokoyama | G06F 40/123 |
| | | | | 715/760 |
| 2016/0188744 | A1* | 6/2016 | Ito | G06F 16/986 |
| | | | | 707/602 |
| 2017/0102972 | A1 | 4/2017 | Ben-Yair et al. | |
| 2017/0220449 | A1 | 8/2017 | Munoz Sanchez et al. | |
| 2017/0242839 | A1* | 8/2017 | Maita | G06F 16/33 |
| 2017/0242853 | A1* | 8/2017 | Maita | G06F 16/00 |
| 2017/0300574 | A1* | 10/2017 | Maita | G06F 16/958 |
| 2018/0322341 | A1* | 11/2018 | Qin | G06K 9/00469 |
| 2019/0065589 | A1* | 2/2019 | Wen | G06N 7/005 |
| 2019/0171945 | A1* | 6/2019 | Ganhotra | G06F 40/20 |
| 2019/0188226 | A1* | 6/2019 | Cheng | G06F 16/955 |

FOREIGN PATENT DOCUMENTS

| | | | | |
|---|---|---|---|---|
| CN | 102779169 A | * | 11/2012 | |
| CN | 105630941 A | | 6/2016 | |
| JP | 2005301437 A | * | 10/2005 | |
| WO | WO-2013178193 A2 | * | 12/2013 | G06F 16/9577 |

OTHER PUBLICATIONS

Li et al., "Extracting Main Content of Webpage to Enhance Adaptively Rendering for Small Screen Size Terminals", 2015 International Conference of Educational Innovation through Technology, IEEE, Oct. 16-18, 2015, pp. 94-98. (Year: 2015).*

Barbosa et al., "An Adaptive Crawler for Locating Hidden-Web Entry Points," Proceedings of the 16th International Conference on World Wide Web, May 2007, pp. 441-450. (Year: 2007).*

Mohammadzadeh et al., "A Fast and Accurate Approach for Main Content Extraction based on Character Encoding," 2011 22nd International Workshop on Database and Expert Systems Applications, IEEE, 2011, pp. 167-171. (Year: 2011).*

Apache, "Apache Tika—A Content Analysis Toolkit," Apache Tika, p. 1-11, The Apache Software Foundation, https://tika.apache.org/, Accessed on Mar. 22, 2018.

Datalib, "libextract: Extract Data from Websites using Basic Statistical Magic," GitHub, p. 1-2, https://github.com/datalib/libextract, Accessed on Mar. 22, 2018.

GRAVITYLABS, "Goose Wiki," GitHub, p. 1-4, https://github.com/GravityLabs/goose/wiki, Accessed on Mar. 22, 2018.

Kohlschütter, "boilerpipe: Work in Progress Transmit from Google Code," GitHub, p. 1, https://github.com/kohlschutter/boilerpipe, Accessed on Mar. 22, 2018.

Kohlschütter et al., "A Densitometric Approach to Web Page Segmentation," CIKM'08, Oct. 26-30, 2008, p. 1173-1182, ACM, Napa Valley, California, USA.

Louvan, "Extracting the Main Content from HTML Documents," The 21st Benelux Conference on Artificial Intelligence (BNAIC 2009), Oct. 29-30, 2009, 8 Pages, Eindhoven, The Netherlands.

Mell et al., "The NIST Definition of Cloud Computing," National Institute of Standards and Technology, Sep. 2011, p. 1-3, Special Publication 800-145.

Song et al., "Learning Block Importance Models for Web Pages," WWW 2004, May 17-22, 2004, p. 203-211, ACM, New York, NY, USA.

* cited by examiner

SELF-ADAPTIVE WEB CRAWLING AND TEXT EXTRACTION

BACKGROUND

The present invention relates generally to the field of computing, and more particularly to software management.

The layout of a particular website may be changed by altering the hypertext mark-up language (HTML) structure of the website. Such a structural change causes the removal or relocation of main content in the website.

SUMMARY

Embodiments of the present invention disclose a method, computer system, and a computer program product for crawling and extracting main content from a web page. The present invention may include retrieving a HTML document associated with a web page. The present invention may then include identifying at least one entry point located in the retrieved HTML document by utilizing a self-adaptive entry point locator. The present invention may also include extracting a main content article associated with the retrieved HTML document based on the identified at least one entry point. The present invention may further include presenting the extracted main content associated with the retrieved HTML document to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
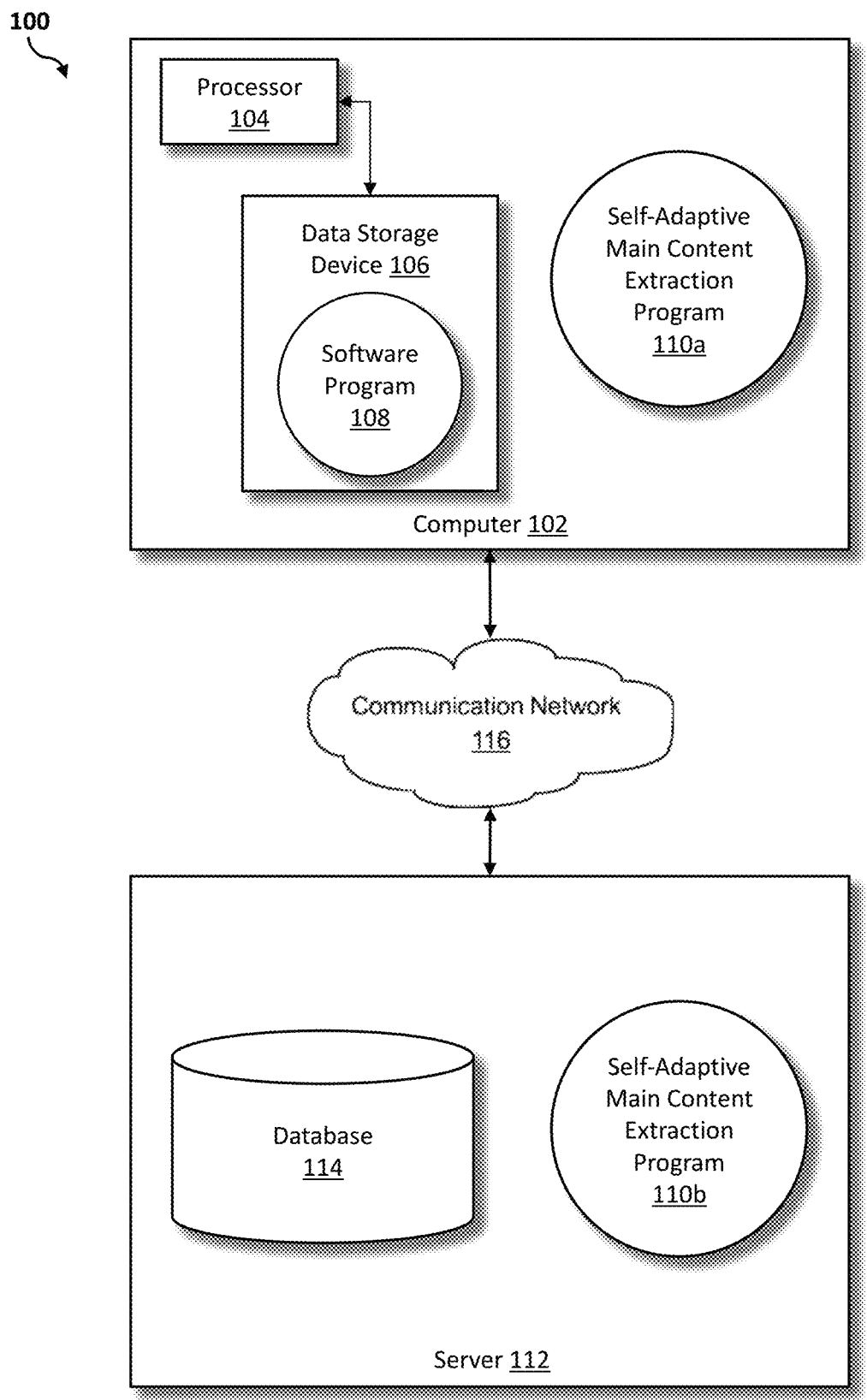
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for crawling and extracting main content from a web page. As such, the present embodiment has the capacity to improve the technical field of software management by adapting to changing positions of new entry points to extract main article content from a web page. More specifically, the self-adaptive main content extraction program may retrieve a HTML document associated with a web page and then identify at least one entry point located in the retrieved HTML document by utilizing a self-adaptive entry point locator. The self-adaptive main content extraction program may then extract a main content article associated with the retrieved HTML document based on the identified at least one entry point and the extracted main content associated with the retrieved HTML document may be presented to the user.

As previously described, the layout of a particular website may be changed by altering the hypertext mark-up language (HTML) structure of the website. Such a structural change causes the removal or relocation of main content in the website.

Generally, a user may manually include the specific entry point or excluded contents to extract the main content article from a changing HTML document. As such, without the specific entry point and the exclusions, the user may not find the main content for extraction, therefore, limiting the effectiveness and efficiency of the self-adaptive main content extraction process.

Therefore, it may be advantageous to, among other things, automatically extract a main content article from a web page by locating at least one dynamic entry point (e.g., a specific tag or class) regardless of whether the location of the entry point has changed and with minimal (if any) human interaction.

According to at least one embodiment, the self-adaptive main content extraction program may automatically identify entry points of a small set of seeding documents. The self-adaptive main content extraction program may then continuously crawl for new documents and extract main contents based on their entry points. When the entry points are not found, the self-adaptive main content extraction program may wait for other crawling threads to extract similar documents, and the self-adaptive main content extraction program may then utilize the extracted contents to perform a similarity check to identify the correct entry point.

The present embodiment may be utilized to re-identify new entry points, when a website layout is upgraded. The self-adaptive main content extraction program may be used to extract old text to test the upgraded web source, and re-identify the new entry points utilizing a similarity check.

According to at least one embodiment, the self-adaptive main content extraction program may be self-growing and self-adaptive, with no manual efforts. As such, the self-adaptive main content extraction program improves and updates the extraction patterns depending on whether the entry point of the HTML document, or entry points or title of a similar HTML document is known. Therefore, the main content of web pages may be extracted without human intervention after the seeding phase.

According to at least one embodiment, the self-adaptive main content extraction program may automatically populate more entries or seeds (i.e., document domain with corresponding entry point in extensible markup language (XPath) or cascading style sheets (CSS) format) after each entry point is identified. Therefore, the self-adaptive main content extraction program may generate a list of seeds or entry points during the seeding phase. The more entry points on the list, the easier the self-adaptive main content extraction program may be able to identify entry points. As such, a domain may be known if the self-adaptive main content extraction program includes a corresponding entry point found and saved during the seeding phase.

The present embodiment may include learning from new and old documents. While the site contents HTML structure changes, the self-adaptive main content extraction program may adapt to the new structure. When a new HTML structure or a change in the HTML structure is encountered, the self-adaptive main content extraction program may leverage similar documents on other web sites for searching for entry points. The self-adaptive main content extraction program may search older (previously crawled HTML files) associated with the browsed HTML document, and for these older articles, the self-adaptive main content extraction program may generate at least one entry point associated with the browsed HTML document.

The present embodiment may include an entry point determination for each media. Since each media may include different entry points due to the different HTML structure, the self-adaptive main content extraction program may utilize a mechanism to crawl through web browsers for similar a HTML document with known entry points to compare the subject HTML document and to extract the main content.

According to at least one embodiment, the self-adaptive main content extraction program may be integrated into another software program. The self-adaptive main content extraction program may be utilized to prepare a HTML document for other artificial intelligence (AI) technology to read and utilize the extracted text associated with the main content article.

According to at least one embodiment, the self-adaptive main content extraction program may be utilized by feeding (or passively parsed by another software program) a custom HTML web page file. For example, a user may prepare some HTML files which include the same content with mutated tag paths against other similar files. Therefore, the self-adaptive main content extraction program may be utilized to extract the main content associated with the mutated tag paths.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a self-adaptive main content extraction program 110a. The networked computer environment 100 may also include a server 112 that is enabled to run a self-adaptive main content extraction program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the self-adaptive main content extraction program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the self-adaptive main content extraction program 110a, 110b (respectively) to crawl and extract main content from a website. The self-adaptive main content extraction method is explained in more detail below with respect to FIGS. 2-3.

Figure 2:
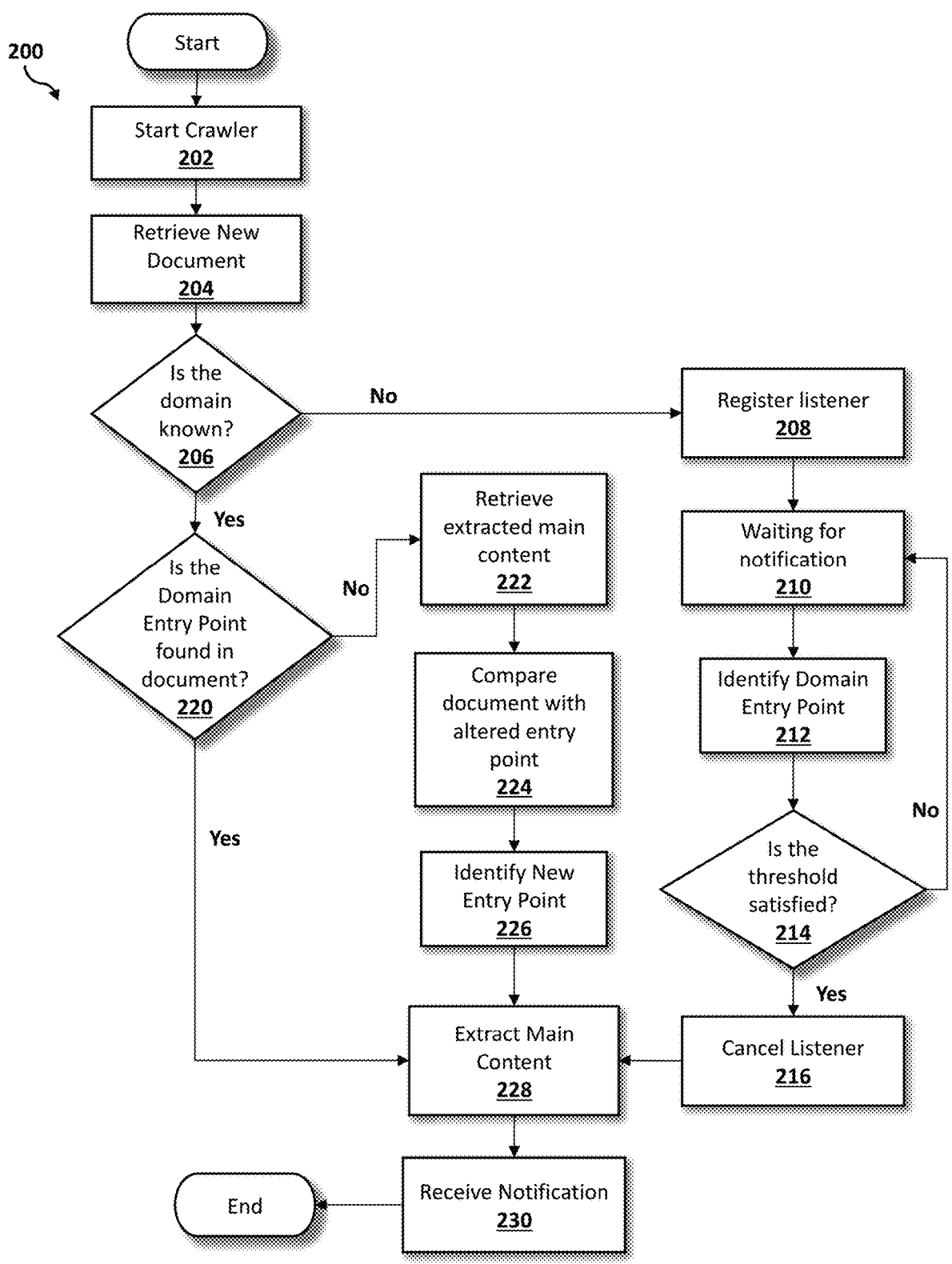
FIG. 2 is an operational flowchart illustrating a process for crawling and extracting main content from a web site according to at least one embodiment.

Referring now to FIG. 2, an operational flowchart illustrating the exemplary crawler and self-adaptive main content extraction process 200 used by the self-adaptive main content extraction program 110a, 110b according to at least one embodiment is depicted.

At 202, a crawler is started. A crawler (i.e., web spider) may be an Internet bot that systemically browses the web for indexing. The self-adaptive main content extraction program 110a, 110b may utilize the crawler as an agent that continuously searches the web for new hypertext mark-up language (HTML) documents that may be returned to the self-adaptive main content extraction program 110a, 110b.

For example, the public library is developing a database on the public library server related to data security (i.e., data security database). As such, a technician for the public library utilizes the self-adaptive main content extraction program 110a, 110b to continuously update and maintain the data security database to ensure that the most recent and relevant articles are included in the data security database. To search the web for new documents related to data security, the self-adaptive main content extraction program 110a, 110b starts a web crawling engine (i.e., crawler).

Then, at 204, a new document is retrieved. Using a software program 108 on the user's device (e.g., user's computer 102), a new HTML document may be loaded as input into the self-adaptive main content extraction program 110a, 110b via communications network 116. The HTML document may include a document object, which is a root node of the HTML document, that provides properties and methods to access all node objects. The HTML document may also include at least one main content article with a title, which may be included in HTML format.

Continuing the previous example, while searching through the web, the web crawling engine retrieves an article from a prestigious computing blog that discusses the current state of data security vulnerability. In the article, the blog also interviewed several security vulnerability experts on effects of anti-malware software on data security. As such, the self-adaptive main content extraction program 110a, 110b should determine whether the main content of the article was previously included in the data security database. The website link is uploaded via fiber optic cables into the self-adaptive main content extraction program 110a, 110b. Additionally, based on the HTML document associated with the data security article, the self-adaptive main content extraction program 110a, 110b determines that the main content article title is "How Vulnerable Is Your Data".

In the present embodiment, if the web site fails to provide a title in HTML format (e.g., tag standard), then the self-adaptive main content extraction program 110a, 110b may utilize the first line of the main content article as the title.

Then, at 206, the self-adaptive main content extraction program 110a, 110b determines whether the domain is known. Since duplicate HTML documents may be located in multiple mediums, the self-adaptive main content extraction program 110a, 110b may search for a similar HTML document to locate at least one entry point for the main content in the retrieved HTML document within a known entries partition of a database (e.g., database 114). As such, the domain may be known if the self-adaptive main content extraction program 110a, 110b has a similar HTML document in the known entries partition of the database. The known entries partition of the database may include a generated list of identified entry points associated with the seeding phase in which a self-adaptive entry locator may be utilized to search the generated list to locate at least one entry point. Each entry point may be located with the corresponding similar HTML document to indicate where the main content is located within the similar HTML document.

With the addition of a new HTML document, the generated list may be a growing list in which the more HTML documents included in the generated list, the easier the self-adaptive main content extraction program 110a, 110b may identify corresponding entry points. The generated lists with the growing number of HTML documents and corresponding identified entry points may be stored in the known entries partition in the database. A detailed operational flowchart of the three separate partitions in the database in the self-adaptive main content extraction program 110a, 110b will be described in greater detail below with respect to FIG. 3.

If the self-adaptive main content extraction program 110a, 110b determines that the domain is not known at 206, then the self-adaptive main content extraction program 110a, 110b registers (i.e., launches) the event listener for a similar document with the same title at 208. Since the known entries partition of the database associated with the self-adaptive main content extraction program 110a, 110b fails to include at least one similar HTML document, the self-adaptive main content extraction program 110a, 110b may utilize at least one event listener (i.e., a thread listener that waits for a specific event to occur to trigger a specific action) to notify the self-adaptive main content extraction program 110a, 110b, whenever the main content with the same title as the retrieved HTML document is found, crawled by the crawler and stored in a crawled HTML files partition of the database (e.g., database 114).

Continuing the previous example, the self-adaptive main content extraction program 110a, 110b reviews the generated entries list stored in the known entries partition of the data security database to determine whether the article and the entry points associated with the HTML structure of the retrieved article on data security is stored on the list. After reviewing the list, the self-adaptive main content extraction program 110a, 110b determines that the HTML document was not previously stored in the known entries partition of the data security database. As such, the domain associated with retrieved HTML document on data security is not known. The self-adaptive main content extraction program 110a, 110b then launches an event listener to notify the self-adaptive main content extraction program 110a, 110b when a similar HTML document with the same title is retrieved by the web crawling engine.

Then, at 210, the self-adaptive main content extraction program 110a, 110b waits for notification by the event listener. Until the event listener notifies the self-adaptive main content extraction program 110a, 110b that the specific HTML document with the same title (i.e., similar HTML document) has been retrieved, the self-adaptive main content extraction process 200 may be suspended. When the similar HTML document has been retrieved, then the self-adaptive main content extraction process 200 may resume to identify at least one entry point.

Continuing the previous example, the self-adaptive main content extraction process 200 is suspended while the web crawling engine searches for a HTML document with the same main content article title of "How Vulnerable Is Your Data". Therefore, the self-adaptive main content extraction program 110a, 110b waits until a notification by the event listener has been received.

Then, at 212, at least one domain entry point is identified. The self-adaptive main content extraction program 110a, 110b may utilize a self-adaptive entry locator to search through the similar HTML document to identify at least one domain entry point that includes the same main content as the retrieved HTML document.

Continuing the previous example, the web crawling engine searches the web and finds a HTML document with the same main content article title "How Vulnerable Is Your Data". A self-adaptive entry locator then searches through the HTML document with the same title and identifies the following domain entry point associated with the main content article that is the same as the retrieved HTML document:

<div.row.post(1.0000000)>

Then, at 214, the self-adaptive main content extraction program 110a, 110b determines whether the threshold was satisfied. Since multiple similar entry points may be generated, a similarity check may be performed on the text of the main content article associated with each of the identified domain entry points to determine whether the most similar entry point exceeds the pre-defined threshold. If the HTML document, with the same title as the retrieved HTML document, obtains a similarity score that satisfies a certain pre-defined threshold, then the self-adaptive main content extraction program 110a, 110b may determine that the HTML document with the same title as the retrieved HTML document may be a similar HTML document with the most similar entry point.

The self-adaptive main content extraction program 110a, 110b may implement the Hamming distance and linear code, or the Levenshtein distance and code to generate a similarity score between the text in the main content article for the most similar entry point. The similarity score may range from 0-1.0, or some range that may be normalized to 0-1.0 in which a higher similarity score indicates a higher the similarity between the similar HTML document to the retrieved HTML document. As such, if the similarity score satisfies a pre-defined threshold, then the similar HTML document may be considered a similar to the retrieved HTML document and may be stored in the database. Additionally, the most similar entry point may be utilized to extract the main content article within the retrieved HTML document.

In the present embodiment, the self-adaptive main content extraction program 110a, 110b may include a default threshold (e.g., 0.9 similarity score which is normalized as a 90% similarity between the two HTML documents) for a similarity check. The default threshold is a standard threshold that may be included in each similarity check. The default threshold may be removed or altered by a system administrator of the self-adaptive main content extraction program 110a, 110b.

In the present embodiment, a document object model (DOM) is an application programming interface (API) that may be utilized for a valid HTML and well-formed extensible markup language (XML) document. The DOM may be further utilized to provide a logical structure for HTML documents and a method for HTML documents to be accessed and manipulated. The DOM in HTML documents may form a node tree (i.e., including the root node or top node, parent node, children node and sibling node), and the self-adaptive main content extraction program 110a, 110b may include a similarity score for each node tree associated with each HTML document. The similarity score on each node tree may be utilized to identify the domain entry point of the main content article associated with the retrieved HTML document and the similar HTML document.

If the self-adaptive main content extraction program 110a, 110b determines that the similarity score for the new HTML document, with the most similar entry point, fails to satisfy the pre-defined threshold at 214, then the HTML document may be rejected as similar to the retrieved HTML document and the self-adaptive main content extraction program 110a, 110b may return to waiting for notification from the event listener at 210. While the crawler continues to search for another HTML document, with the most similar entry point and the same title (i.e., second similar HTML document) to satisfy the pre-defined threshold, the self-adaptive main content extraction process 200 may then remain suspended.

Continuing the previous example, the self-adaptive main content extraction program 110a, 110b performs a text similarity check on the HTML document with the same title and the retrieved HTML document. The pre-defined threshold is 0.95 for the similar HTML document with the same title to satisfy the threshold in the similarity check. The HTML document with the same title relates to data security breaches within a federal agency and the policy implementations associated with data protection. As such, the text similarity check between the similar HTML document and the retrieved HTML document generated a similarity score of 0.67, which is less than the pre-defined threshold. Since the similar HTML document fails to satisfy the pre-defined threshold, the self-adaptive main content extraction process 200 may then remain suspended and continues to wait for notification from the event listener.

After performing similarity checks on seven different similar HTML documents with the same main content article title "How Vulnerable Is Your Data," the event listener retrieved a similar HTML document with the following identified domain entry point:

<div.col-lg-8.col-md-7.col-sm-6.col-xs-12>

The similar HTML document generated a similarity score of 0.98, which satisfies the pre-defined threshold.

If, however, the self-adaptive main content extraction program 110a, 110b determines that the similarity score for the HTML document, with the same title and the most similar domain entry point, satisfies the threshold at 214, then the event listener is canceled at 216. Since the similar HTML document with the same title and most similar domain entry point has been identified and satisfies the similarity threshold, the self-adaptive main content extraction program 110a, 110b may automatically cancel the event listener. The self-adaptive main content extraction program 110a, 110b may then stop waiting for the identification of at least one corresponding entry point to a HTML document that is similar to the retrieved HTML document by the event listener.

Continuing the previous example, since the most similar domain entry point to the compared HTML document with the same title has been identified and the similarity score for the compared HTML document is 0.98, which exceeds the pre-defined threshold, the self-adaptive main content extraction program 110a, 110b is no longer waiting for notification from the event listener. Therefore, the event listener is automatically canceled.

In the present embodiment, the user may manually cancel the listener when the domain entry point has been identified. A screen may appear in which, for example, a "Settings" button is located on the bottom right side. Once the user clicks on the "Settings" button, the user may be prompted (e.g., via dialog box) with a list of setting options for the self-adaptive main content extraction program 110a, 110b. Among of the list of setting options, there may be an option for the canceling the listener. If the user clicks on that option, then the user may be prompted (e.g., via another dialog box) whether the user intends to cancel the listener with "Yes" and "No" buttons at the bottom of the dialog box. If the user clicks the "Yes" button, then the dialog box may disappear and the listener may be canceled.

If the self-adaptive main content extraction program 110a, 110b determines that the domain is known at 206, then the self-adaptive main content extraction program 110a, 110b determines whether the domain entry point is found in the document at 220. When the domain of the retrieved HTML document is known (i.e., the retrieved HTML document is located in the known entries partition of the database), the self-adaptive main content extraction program 110a, 110b may search the generated list of entry points in the known entries partition to determine if the corresponding entry point included in the generated list matches the domain entry point within the retrieved HTML document.

Continuing the previous example, if the domain associated with the retrieved HTML document is known, then the self-adaptive main content extraction program 110a, 110b will search the generated list of entry points to determine if the corresponding entry point in the generated list is found in the retrieved HTML document.

If the self-adaptive main content extraction program 110a, 110b determines that the domain entry point is not found in the document at 220, then the extracted main content is retrieved at 222. When the HTML structure of the document changes, the domain entry point may fail to match the corresponding entry points on the generated list since the entry point may have been altered to create the changes to the document. As such, the self-adaptive main content extraction program 110a, 110b may retrieve the extracted main content in an older HTML document with the same title located in the known entries partition which may be compared to the retrieved HTML document to identify at least one new entry point.

Continuing the previous example, if the search of the generated list of entry points determines that the corresponding entry point in the generated list is not found in the retrieved HTML document, the self-adaptive main content extraction program 110a, 110b will then retrieve the extracted main content article in the older similar HTML document stored in the data security database.

Then, at 224, the retrieved document with an altered entry point is compared. The self-adaptive main content extraction program 110a, 110b may compare the retrieved HTML document with the altered entry point with the extracted main content in an older similar HTML document with the same title located in the known entries partition to identify the new entry point.

Continuing the previous example, the self-adaptive main content extraction program 110a, 110b then compares the extracted main content article in the older similar HTML document with the retrieved HTML document with the altered entry point.

Then, at 226, the new entry point is identified. By reversely searching the entry point in the altered document containing the extracted main content, the self-adaptive main content extraction program 110a, 110b may identify the new entry point for the retrieved HTML document.

Continuing the previous example, the comparison of the main content article in the older similar HTML document located in the data security database with the retrieved HTML document entitled "How Vulnerable Is Your Data" with the altered entry point will identify the new entry point for the main content article in the retrieved HTML document. The following identified entry point is in the older similar HTML document and the retrieved HTML document:

<div class="row post">

As such, the <div class="row post"> is the entry point for the main content that is located in both the retrieved HTML document with the altered entry point and the older similar HTML document in the same known domain.

In the present embodiment, the self-adaptive main content extraction program 110a, 110b may indicate the location of the entry point by highlighting the identified entry point in the older similar HTML document.

If the self-adaptive main content extraction program 110a, 110b determined that the domain entry point is found in the document at 220, the new entry point was identified at 226, or the listener is canceled at 216, the main content is then extracted at 228. The identified entry points (e.g., identified new entry point at 226, identified domain entry point at 212, or the domain entry point is found in the document at 220) may be utilized to determine the location of the main content. When the domain entry point is identified within the retrieved HTML document, the main content may be indicated by highlighting the text. Then, the main content may be extracted from the retrieved HTML document by utilizing a text extraction engine.

Additionally, the new entry point to the retrieved HTML document may be utilized to update the growing list of entry points in the known entries partition of the database, the similar HTML document may be stored in the crawled HTML files partition of the database, and the extracted main content article may be stored in the extracted articles partition of the database. A detailed operational flowchart of the three separate partitions in the database in the self-adaptive main content extraction program 110a, 110b will be described in greater detail below with respect to FIG. 3.

Continuing the previous example, the self-adaptive main content extraction program 110a, 110b utilizes the located domain entry point, <div.col-lg-8.col-md-7.col-sm-6.col-xs-12>, to locate the main content article from the retrieved HTML document. Once the corresponding domain entry point in the retrieved HTML document is located, the self-adaptive main content extraction program 110a, 110b utilizes a text extraction engine to extract the main content article from the retrieved HTML document.

Then, at 230, a notification is received. After the main content is extracted from the retrieved HTML document, the self-adaptive main content extraction program 110a, 110b may be notified that the main content is extracted from the retrieved HTML document. As such, the self-adaptive main content extraction program 110a, 110b may continue to retrieve new HTML documents for main content extraction.

Continuing the previous example, the self-adaptive main content extraction process 200 will resume and another new HTML document will be retrieved and the main content within the new HTML document will be extracted based on at least one entry point in the new retrieved HTML document.

In the present embodiment, the user may access the extracted main content for the retrieved HTML document generated by self-adaptive main content extraction program 110a, 110b. Alternatively, the extracted main contact for the retrieved HTML document may be fed into another software program (e.g., Watson™ (Watson and all Watson-based trademarks and logos are trademarks or registered trademarks of International Business Machines Corporation and/or its affiliates)) for further processing.

In the present embodiment, the self-adaptive main content extraction program 110a, 110b may improve and update the extraction patterns by automatically extracting content, as well as utilizing databases to store similar documents, files and previously extracted articles with located entry points. The self-adaptive main content extraction program 110a, 110b may also improve and update extraction patterns by learning the commonly located entry points and searching for similar entry points in documents similar to the retrieved document.

In another embodiment, a user may provide the list of entry points (i.e., seeding list) in the known entries partition of the database, and the user may be presented with updates related to the seeding list as the seeding list expands. Additionally, the user may also monitor and access the extracted articles in the extracted articles partition in the database.

Figure 3:
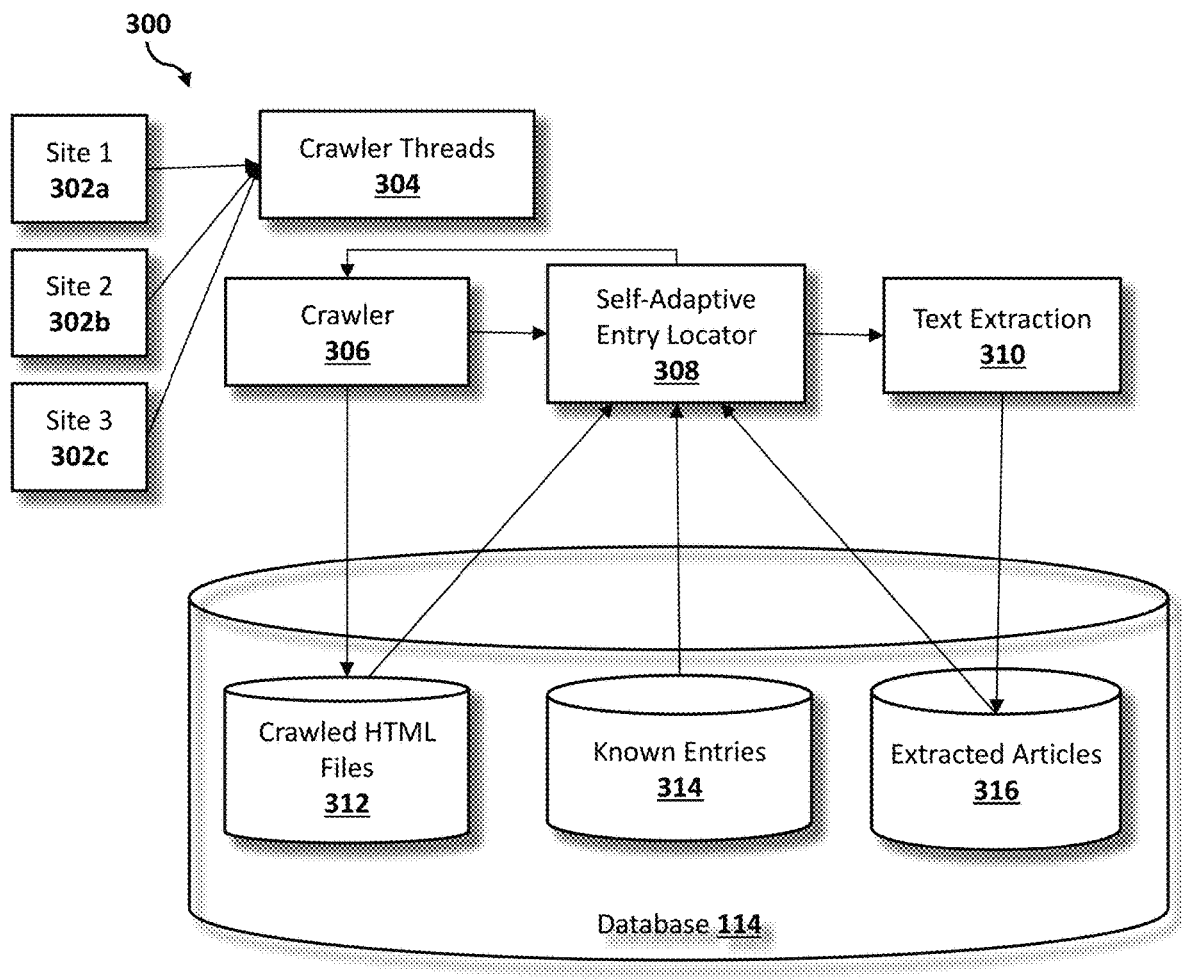
FIG. 3 is an operational flowchart illustrating a process of crawling and self-adaptive entry locating according to at least one embodiment.

Referring now to FIG. 3, an operational flowchart illustrating the exemplary crawler and self-adaptive entry location process 300 within a crawled HTML files, a known entries and an extracted articles partition within a database used by the self-adaptive main content extraction program 110a, 110b according to at least one embodiment is depicted.

As shown, the self-adaptive main content extraction program 110a, 110b may include a database 114 divided into three partitions, crawled HTML files 312, known entries 314 and extracted articles 316. The crawler threads 304 may search various web pages, Site 1 (302a), Site 2 (302b) and Site 3 (302c). When HTML files searched by the crawler threads are found, the crawler 306 may store the crawled HTML files into the crawled HTML files partition 312 of the database 114. The self-adaptive main content extraction program 110a, 110b may then locate at least one entry point associated with each of the crawled HTML files by utilizing a self-adaptive entry locator 308. The located entry points associated with the crawled HTML files may then be stored in the known entries partition 314 of the database 114. Then, at 310, the self-adaptive main content extraction program 110*a*, 110*b* may then utilize a text extraction engine to extract the main content text associated with the identified entry points from the crawled HTML files. The extracted text (i.e., extracted articles) may then be stored in the extracted articles partition 316 of the database 114.

It may be appreciated that FIGS. 2-3 provide only an illustration of one embodiment and do not imply any limitations with regard to how different embodiments may be implemented. Many modifications to the depicted embodiment(s) may be made based on design and implementation requirements.

Figure 4:
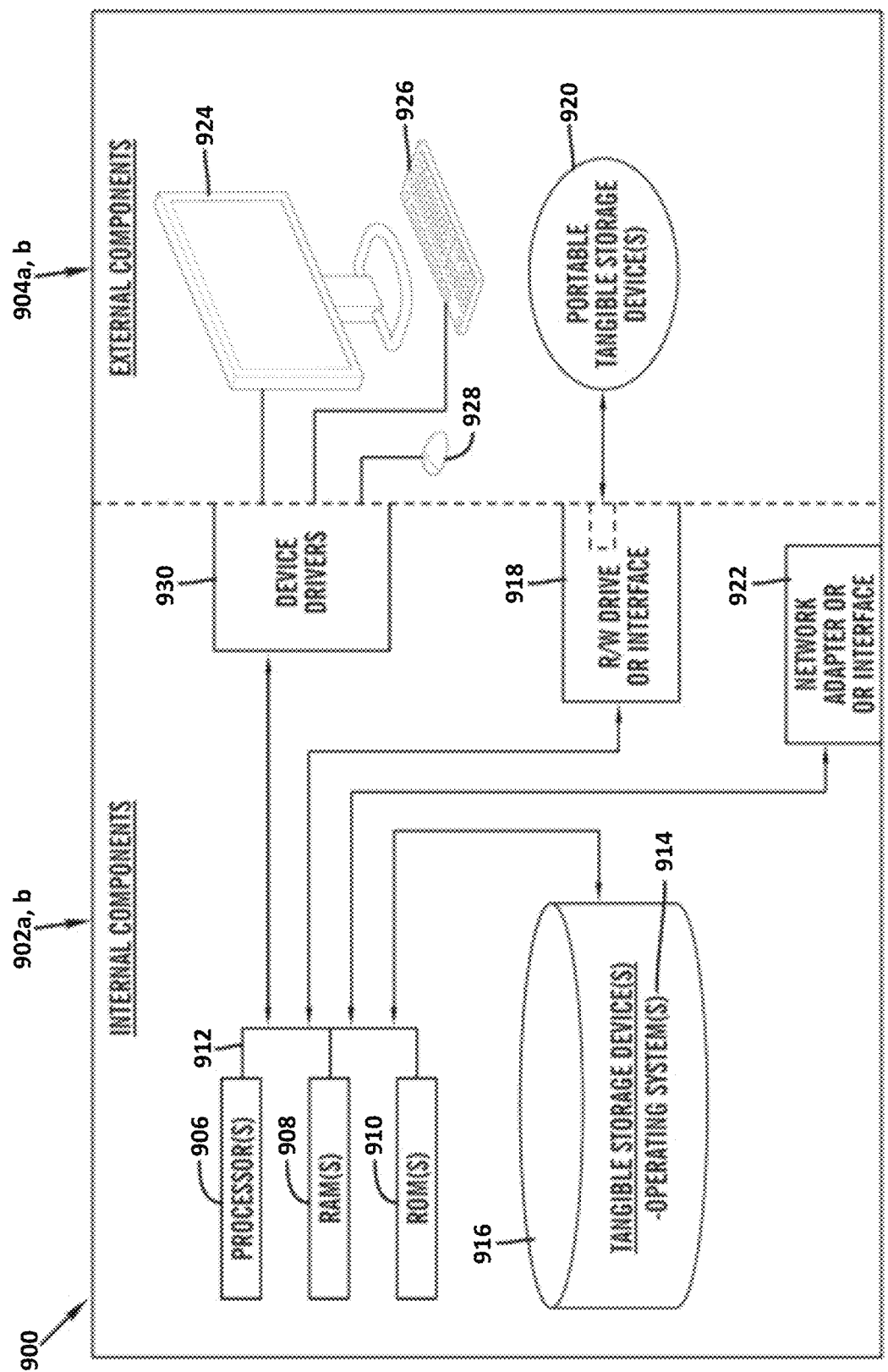
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the self-adaptive main content extraction program 110*a* in client computer 102, and the self-adaptive main content extraction program 110*b* in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the self-adaptive main content extraction program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless Wi-Fi interface cards, or 3G or 4G wireless interface cards or other wired or wireless communication links. The software program 108 and the self-adaptive main content extraction program 110*a* in client computer 102 and the self-adaptive main content extraction program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the self-adaptive main content extraction program 110*a* in client computer 102 and the self-adaptive main content extraction program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
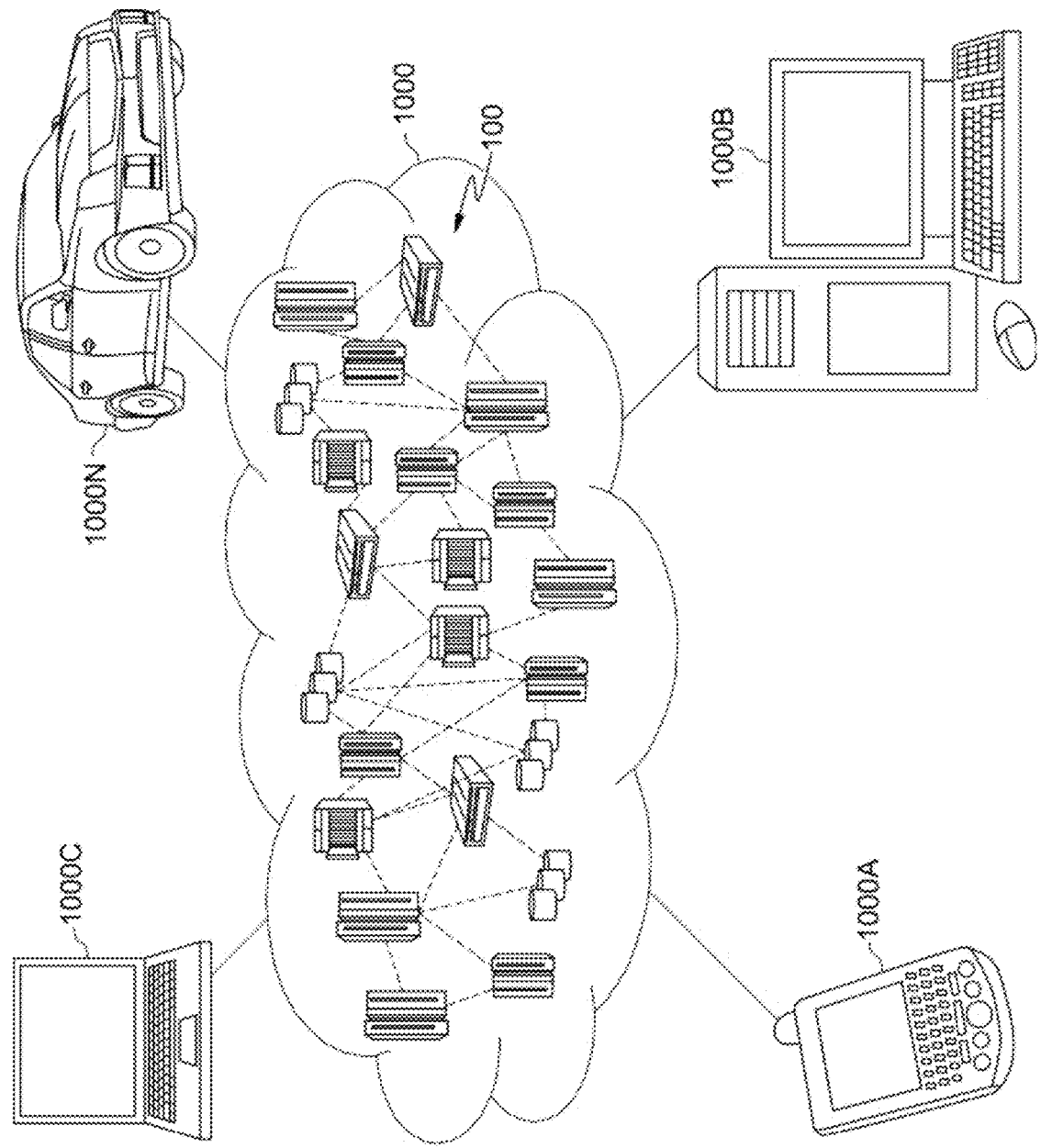
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
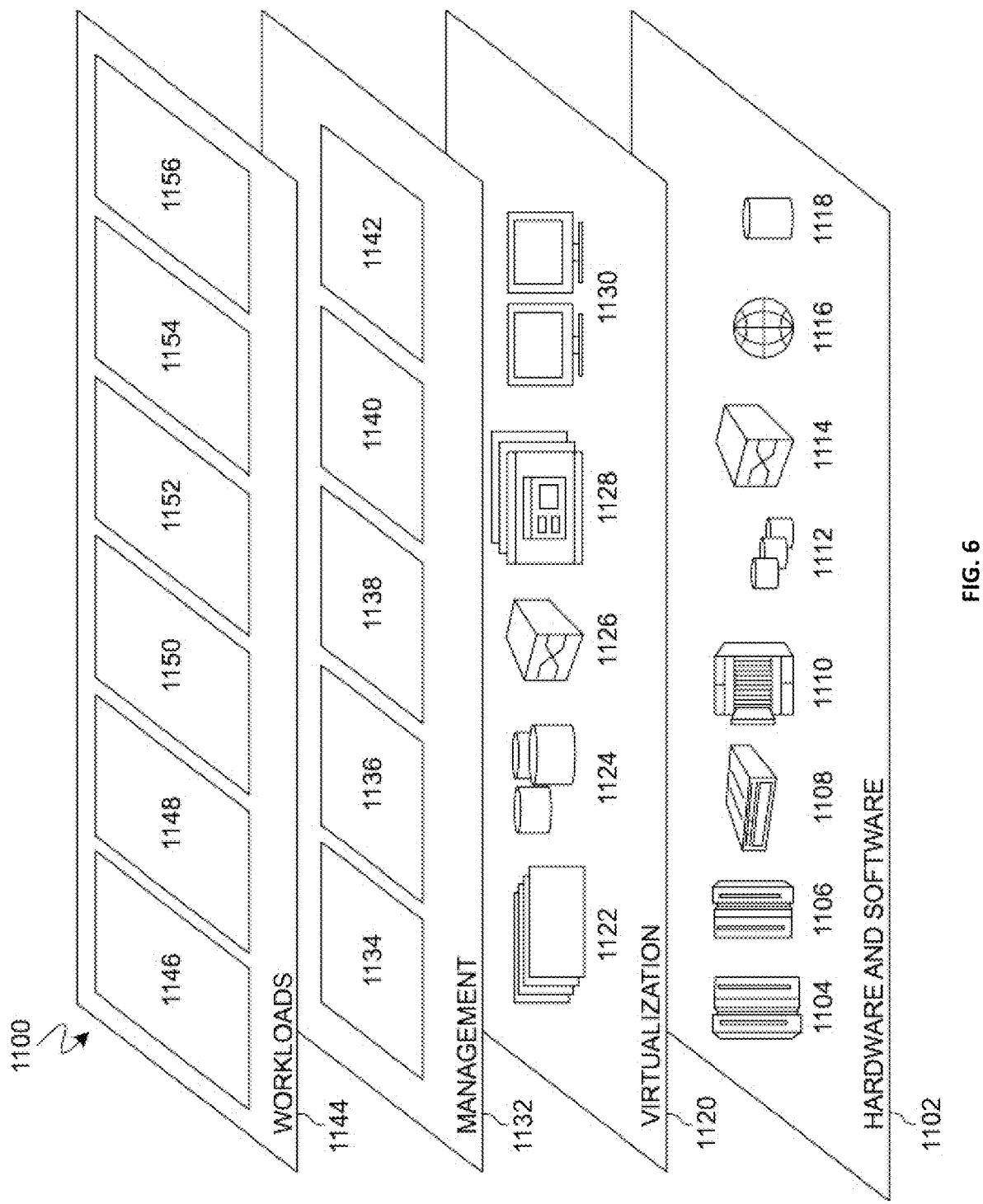
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and self-adaptive main content extraction 1156. A self-adaptive main content extraction program 110*a*, 110*b* provides a way to crawl and extract main content from a website.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for crawling and extracting main content from a web page, the method comprising:
   retrieving a HTML document associated with a web page;
   identifying at least one entry point located in the retrieved HTML document by utilizing a self-adaptive entry point locator, wherein identifying at least one entry point located in the retrieved HTML document by utilizing a self-adaptive entry point locator comprises identifying at least one domain entry point associated with the retrieved HTML document based on at least one similar entry point in a similar HTML document with a same title as the retrieved HTML document, wherein the retrieved HTML document is located in a different domain from the similar HTML document;
   extracting a main content article associated with the retrieved HTML document based on the identified at least one entry point; and
   presenting the extracted main content article associated with the retrieved HTML document to a user.

2. The method of claim 1, further comprising:
   performing a text similarity check between the similar HTML document and the retrieved HTML document to generate a similarity score;
   determining that the generated similarity score fails to satisfy a pre-defined threshold; and
   searching for a second similar HTML document with the same title associated with the retrieved HTML document.

3. The method of claim 1, further comprising:
   performing a text similarity check between the similar HTML document and the retrieved HTML document to generate a similarity score;
   determining that the generated similarity score satisfies a pre-defined threshold; and
   canceling an event listener used for identifying similar HTML documents with the same title associated with the retrieved HTML document.

4. The method of claim 1, wherein identifying at Last one entry point located in the retrieved HTML document by utilizing the self-adaptive entry point locator, further comprises:
   determining the retrieved HTML document is located in the same domain with a similar older HTML document, wherein a plurality of domain entry points associated with the main content article associated with the retrieved HTML document were altered, wherein the altered plurality of domain entry points associated with the main content article associated with the retrieved HTML document fails to match at least one entry point associated with the similar older HTML document;
   comparing the altered plurality of domain entry points associated with the main content article associated with the retrieved HTML document with a plurality of entry points associated with a same main content article associated with the similar older HTML document; and
   identifying at least one new entry point associated with the main content article associated with the retrieved HTML document based on the compared plurality of entry points associated with a same main content article associated with the similar older HTML document.

5. The method of claim 1, wherein identifying at least one entry point located in the retrieved HTML document by utilizing the self-adaptive entry point locator, further comprises:
   determining the retrieved HTML document is located in the same domain with a similar older HTML document; and
   determining the retrieved HTML document includes at least one similar domain entry point for a same main content article to the similar older HTML document.

6. The method of claim 1, further comprising:
   storing the retrieved HTML document, an identified similar HTML document with the same title, at least one identified domain entry point, and the extracted main content article associated with the retrieved HTML document into a database,
   wherein the retrieved HTML document and the identified similar HTML document with the same title is stored in a crawled HTML files partition associated with the database,
   wherein the stored at least one domain entry point is stored in a known entries partition associated with the database,
   wherein the extracted main content article associated with the retrieved HTML document is stored in an extracted articles partition associated with the database.

7. A computer system for crawling and extracting main content from a web page, comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is configured to perform a method comprising:
   retrieving a HTML document associated with a web page;
   identifying at least one entry point located in the retrieved HTML document by utilizing a self-adaptive entry point locator, wherein identifying at least one entry point located in the retrieved HTML document by utilizing a self-adaptive entry point locator comprises identifying at least one domain entry point associated with the retrieved HTML document based on at least one similar entry point in a similar HTML document with a same title as the retrieved HTML document, wherein the retrieved HTML document is located in a different domain from the similar HTML document;

extracting a main content article associated with the retrieved HTML document based on the identified at least one entry point; and presenting the extracted main content article associated with the retrieved HTML document to a user.

8. The computer system of claim 7 further comprising:
performing a text similarity check between the similar HTML document and the retrieved HTML document to generate a similarity score;
determining that the generated similarity score fails to satisfy a pre-defined threshold; and
searching for a second similar HTML document with the same title associated with the retrieved HTML document.

9. The computer system of claim 7 further comprising:
performing a text similarity check between the similar HTML document and the retrieved HTML document to generate a similarity score;
determining that the generated similarity score satisfies a pre-defined threshold; and
canceling an event listener used for identifying similar HTML documents with the same title associated with the retrieved HTML document.

10. The computer system of claim 7, wherein identifying at least one entry point located in the retrieved HTML document by utilizing the self-adaptive entry point locator, further comprises:
determining the retrieved HTML document is located in the same domain with a similar older HTML document, wherein a plurality of domain entry points associated with the main content article associated with the retrieved HTML document were altered, wherein the altered plurality of domain entry points associated with the main content article associated with the retrieved HTML document fails to match at least one entry point associated with the similar older HTML document;
comparing the altered plurality of domain entry points associated with the main content article associated with the retrieved HTML document with a plurality of entry points associated with a same main content article associated with the similar older HTML document; and
identifying at least one new entry point associated with the main content article associated with the retrieved HTML document based on the compared plurality of entry points associated with a same main content article associated with the similar older HTML document.

11. The computer system of claim 7, wherein identifying at least one entry point located in the retrieved HTML document by utilizing the self-adaptive entry point locator, further comprises:
determining the retrieved HTML document is located in the same domain with a similar older HTML document; and
determining the retrieved HTML document includes at least one similar domain entry point for a same main content article to the similar older HTML document.

12. The computer system of claim 7, further comprising:
storing the retrieved HTML document, an identified similar HTML document with the same title, at least one identified domain entry point, and the extracted main content article associated with the retrieved HTML document into a database,
wherein the retrieved HTML document and the identified similar HTML document with the same title is stored in a crawled HTML files partition associated with the database,
wherein the stored at least one domain entry point is stored in a known entries partition associated with the database,
wherein the extracted main content article associated with the retrieved HTML document is stored in an extracted articles partition associated with the database.

13. A computer program product for crawling and extracting main content from a web page, comprising:
one or more non-transitory computer-readable storage media and program instructions stored on at least one of the one or more non-transitory computer-readable storage media, the program instructions executable by a processor to cause the processor to perform a method comprising:
retrieving a HTML document associated with a web page;
identifying at least one entry point located in the retrieved HTML document by utilizing a self-adaptive entry point locator, wherein identifying at least one entry point located in the retrieved HTML document by utilizing a self-adaptive entry point locator comprises identifying at least one domain entry point associated with the retrieved HTML document based on at least one similar entry point in a similar HTML document with a same title as the retrieved HTML document, wherein the retrieved HTML document is located in a different domain from the similar HTML document;
extracting a main content article associated with the retrieved HTML document based on the identified at least one entry point; and
presenting the extracted main content article associated with the retrieved HTML document to a user.

14. The computer program product of claim 13 further comprising:
performing a text similarity check between the similar HTML document and the retrieved HTML document to generate a similarity score;
determining that the generated similarity score fails to satisfy a pre-defined threshold; and
searching for a second similar HTML document with the same title associated with the retrieved HTML document.

15. The computer program product of claim 13 further comprising:
performing a text similarity check between the similar HTML document and the retrieved HTML document to generate a similarity score;
determining that the generated similarity score satisfies a pre-defined threshold; and
canceling an event listener used for identifying similar HTML documents with the same title associated with the retrieved HTML document.

16. The computer program product of claim 13, wherein identifying at least one entry point located in the retrieved HTML document by utilizing the self-adaptive entry point locator, further comprises:
determining the retrieved HTML document is located in the same domain with a similar older HTML, document, wherein a plurality of domain entry points associated with the main content article associated with the retrieved HTML document were altered, wherein the altered plurality of domain entry points associated with the main content article associated with the retrieved HTML document fails to match at least one entry point associated with the similar older HTML document;

comparing the altered plurality of domain entry points associated with the main content article associated with the retrieved HTML document with a plurality of entry points associated with a same main content article associated with the similar older HTML document; and identifying at least one new entry point associated with the main content article associated with the retrieved HTML document based on the compared plurality of entry points associated with a same main content article associated with the similar older HTML document.

17. The computer program product of claim 13, wherein identifying at least one entry point located in the retrieved HTML document by utilizing the self-adaptive entry point locator, further comprises:

determining the retrieved HTML document is located in the same domain with a similar older HTML document; and determining the retrieved HTML document includes at least one similar domain entry point for a same main content article to the similar older HTML document.

* * * * *